United States Patent Office 3,413,047
Patented Nov. 26, 1968

3,413,047
BEARING DEVICE FOR A VERTICAL SHAFT
OF A CRUSHING CONE OF A GYRATORY
CRUSHER
Anatoly Alexandrovich Levishko, Ulitsa Pobedy 23,
kv. 18, Sverdlovsk, U.S.S.R.
Filed Nov. 18, 1965, Ser. No. 508,435
4 Claims. (Cl. 308—144)

ABSTRACT OF THE DISCLOSURE

A bearing device for a vertical shaft of a crushing cone of a gyratory crusher in which an elastic member completely fills the lower portion of a cylindrical space in a bearing support disposed beneath the shaft, the lower portion of a thrust bearing entering said space and resting on the elastic member and having a peripheral surface of spherical shape which is in annular contact with the support member.

---

Figure 1:
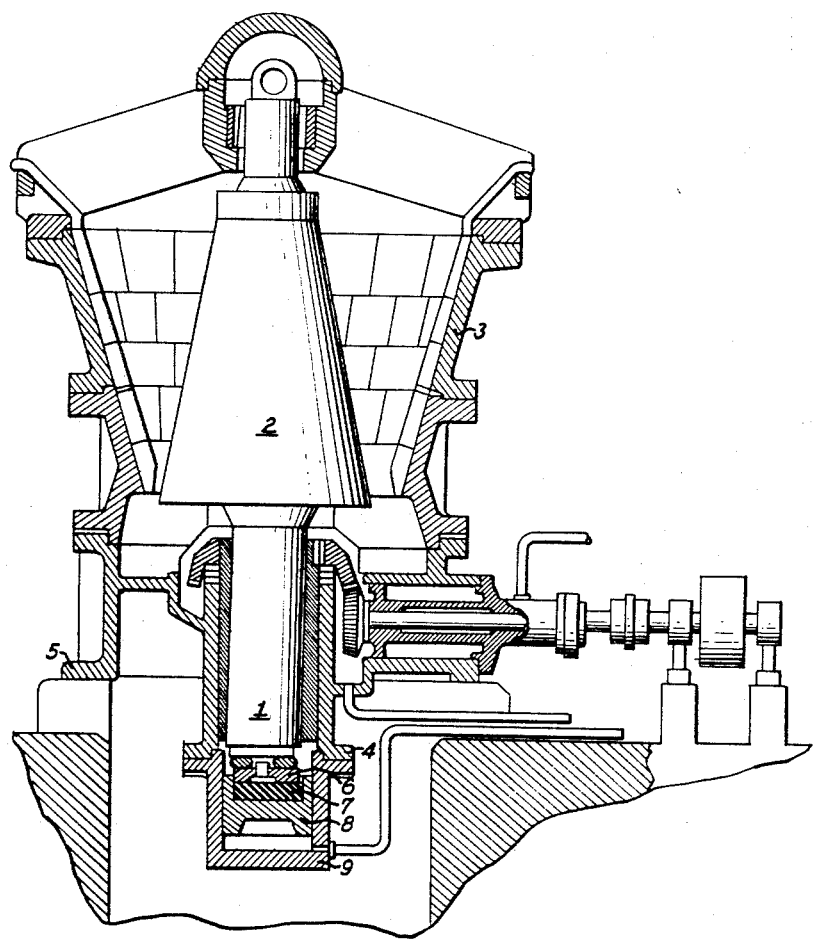

The invention relates to bearing devices of vertical shafts, in particular to such devices installed in a crushing cone of a gyratory crusher.

Known in the art are bearing devices used in crushing cones of gyratory crushers whose crushing cone rests against a thrust sliding contact bearing which, in turn, rests against a rigid support. The sliding contact bearing comprises two bearing discs with a step bearing made of anti-friction material and placed between them. The bearing discs and the step bearing may have their sliding surfaces of various shapes, such as spherical biconvex, spherical plano-convex and spherical biconcave having different curvature radii, etc.

These bearing devices are disadvantageous in that the specific pressure is distributed irregularly, high edge loads are not eliminated, the bearing areas have no adequate protection against being scored which results in the bearing device being rapidly rendered unfit for service. Apart from this, the manufacturing of curvilinear surfaces which are to contact very accurately involves considerable difficulty and is not acceptable in practice since in the process of the crusher operation the contact between the surfaces is disturbed due to gyratory motion of the crushing cone which results in jamming of the contacting surfaces.

Attempts have been made to develop a bearing device for a crushing cone comprising a thrust rolling antifriction bearing which consists of two bearing races with a cage having two solids of rolling between them. The bearing races of a rolling antifriction bearing have flat or spherical bearing surfaces and are provided with grooves for solids of rolling to allow self-adjustment of the bearing races.

Such bearing devices are of poor performance since irregular distribution of loads acting upon the solids of rolling leads to their crumpling owing to jamming in grooves.

There are also known bearing devices of crushing cones which combine rolling friction and sliding contact actions.

Said bearing devices comprise support discs and a vertical rod, having biconcave ends, arranged between them. During gyratory motion of the crushing cone with respect to the crusher axis the contacting surfaces develop rolling friction; at the same time, due to rotation of the crushing cone about its own axis the same surfaces develop the friction of edge sliding.

Such bearing devices are disadvantageous in that the crushing cone does not maintain a stable position and the contacting surfaces are quickly worn.

It is an object of this invention to provide such a bearing device for a crushing cone of a gyratory crusher which is free from the above disadvantages. Said object is achieved by the provision in the bearing device of a crushing cone of a member of an easily-strained material, said member occupying an intermediate position in the assembly of vertical shaft—thrust bearing—bearing support and placed in an enclosed volume confined by the support surface of the thrust bearing resting against said member.

The construction proposed herein allows an employment of both thrust rolling friction and sliding contact bearing to an equal advantage, the sliding contact bearing being made in the form of at least two support discs and a flat step bearing therebetween while the rolling friction bearing consists of two support discs and a cage with spherical rolling members between them. One of the support discs resting against the easily-strained member has a spherical surface along the perimeter of the support area. Since the thrust bearing rests against an easily-strained member, and not against the rigid support, there is no need in making the support planes of the discs curvilinear.

In the rolling friction bearing, to center the solids of rolling, one of the support discs is provided with a pin in the center whose end is spherically shaped, whereas the cage has a central conical hole whose taper faces the conical head.

The easily-strained member can be placed, for instance, in a recess made in the bearing support.

The easily-strained member may comprise a set of rubber discs or an elastic chamber filled with liquid.

Figure 2:
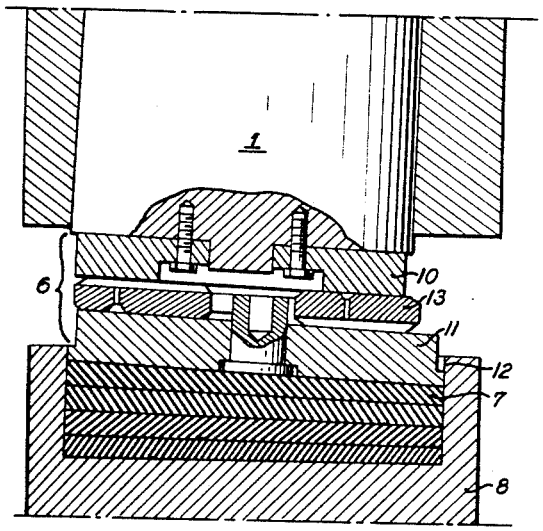
Figure 4:
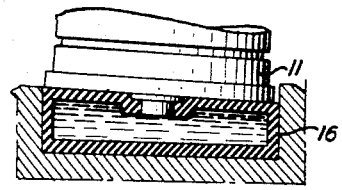
Figure 3:
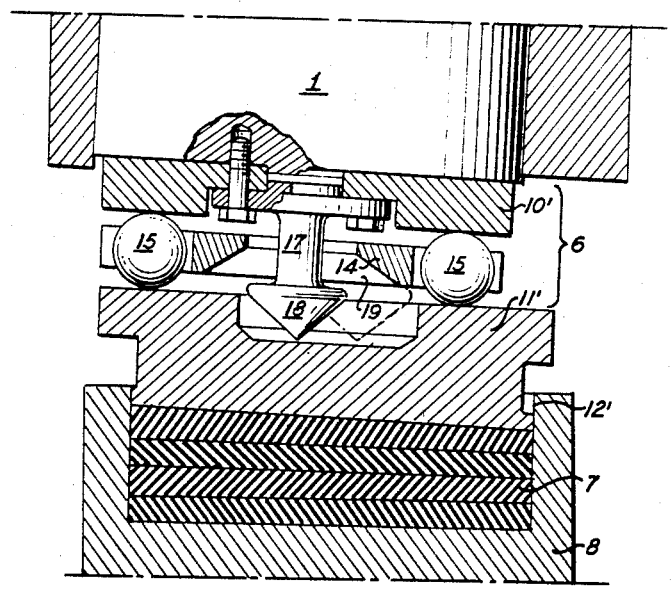

Following is a detailed description of an exemplary embodiment of the invention, reference being had to the accompanying drawings, in which:

FIG. 1 is a vertical section of a cone gyratory crusher;
FIG. 2 is a vertical section on enlarged scale of a bearing device;
FIG. 3 is a view similar to that of FIG. 2 but with employment of a rolling friction bearing; and
FIG. 4 shows in action an embodiment of an easily-strained member made in the form of an elastic chamber filled with liquid.

The lower end of the shaft 1 (FIG. 1) of the crushing cone 2 arranged in the housing 3 of the crusher rests in the lower section of the central sleeve 4 of the crusher bed 5 against the bearing device. The bearing device consists of a thrust bearing 6, against the top of which rests the shaft 1, and which in turn rests on member 7 made of easily-strained, elastic material. The member 7 is placed in a recess in the plunger 8 of a hydraulic cylinder 9 intended for controlling the discharge slot of the crusher. The bearing 6 also confines the recess accommodating the member 7.

The bearing device can be provided with a thrust sliding contact bearing (FIG. 2) or with a thrust rolling friction bearing (FIG. 3).

The thrust bearing consists of flat support discs: the upper flat disc 10, 10' which directly receives the shaft 1 resting in it and the lower support disc 11, 11' resting against the easily-strained member. The disc 11, 11' has a spherical surface 12, 12' along the periphery of its bearing plane.

The thrust sliding contact bearing has a step bearing 13 made of anti-friction material and placed between the discs 10 and 11.

The thrust rolling friction bearing has a cage 14 with spherical members 15 between the discs 10' and 11'.

The bearing devices shown in FIGS. 2 and 3 have their easily-strained members 7 made of a set of rubber discs. The member 7 can be also made as an elastic chamber 16 filled with liquid (FIG. 4).

When the crusher operates, the crushing cone 2 performs a gyratory motion during which the surface of the bottom end of the shaft 1 performs a complicated rotative motion and acts, through the bearing, upon the member 7. Since the member 7 is located in an enclosed volume the flat disc 11, 11' supported thereby becomes self-adjusted to the bearing surface of the shaft end. The upper disc 10, 10' is bolted to the shaft end. This allows a uniform distribution of the load acting upon the solid of rolling which insures a certain degree of freedom which is maintained constant throughout operation.

The sliding and rolling surfaces of the bearing discs being straight, said discs can be displaced freely and independently in any direction horizontally.

To center the solids of rolling when the crushing cone 2 is placed on the bearing device, the upper disc 10' is provided with a center-located pin 17 having a head 18 with a conical surface at its end whereas the cage 14 has a center-located hole 19 whose taper faces the conical head.

When the shaft 1 is mounted the pin 17 passes through the hole 19 centering the cage with respect to the axis of the crushing cone 2. The centering process continues until the upper disc contacts the spherical members 15 while the pin head passes through the hole 19 of the cage.

The spherical members 15 are acted upon by the lower end of the shaft 1 and, consequently, are self-adjusted parallel to the bearing area of the shaft end owing to a change in the shape of the volume of the easily-strained member beneath the disc 11'.

This invention is described with reference to its preferable embodiment but it will be understood that various alterations are possible without departing from the true idea of the invention.

What is claimed is:

1. In combination, a vertical shaft of a crushing cone of a gyratory crusher and a bearing device for said shaft, said bearing device comprising a bearing support beneath said shaft and defining a cylindrical space which opens upwards and faces said shaft, an elastic member completely filling the lower portion of said space, a thrust bearing between said shaft and said elastic member, said thrust bearing including a lower portion which enters said space and rests on said elastic member to confine said elastic member in an enclosed volume, said lower portion of the thrust bearing having a peripheral surface of spherical shape which is in annular contact with the bearing support.

2. The combination as claimed in claim 1 wherein said thrust bearing is a sliding contact bearing including a lower flat disc resting on said elastic member, said lower portion of the thrust bearing being a part of the lower flat disc, a flat bearing step disposed on said lower disc and an upper disc with a flat lower surface resting on said bearing step.

3. The combination as claimed in claim 1 wherein said bearing support is constituted as a piston of a hydraulic cylinder which adjusts the discharge outlet of the crusher.

4. The combination as claimed in claim 2 wherein said elastic member comprises a plurality of rubber discs.

References Cited

UNITED STATES PATENTS

| 809,280 | 1/1906 | Broomall | 308—159 |
|---|---|---|---|
| 2,564,307 | 8/1951 | Keiser | 308—166 |
| 1,534,762 | 4/1925 | Bostick | 308—172 |

FOREIGN PATENTS

| 373,078 | 4/1923 | Germany. |
|---|---|---|
| 496,282 | 2/1937 | Great Britain. |

EDGAR W. GEOGHEGAN, *Primary Examiner.*

FRANK SUSKO, *Assistant Examiner.*